(12) United States Patent
Chen et al.

(10) Patent No.: US 11,405,713 B2
(45) Date of Patent: Aug. 2, 2022

(54) FREE-STANDING WIRELESS-CHARGING HEADSETS

(71) Applicant: Hewlett-Packard Development Company, L.P., Spring, TX (US)

(72) Inventors: Darwin Chen, Ladera Ranch, CA (US); Baron King Lee, Irvine, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 368 days.

(21) Appl. No.: 16/445,209

(22) Filed: Jun. 19, 2019

(65) Prior Publication Data

US 2020/0404409 A1    Dec. 24, 2020

(51) Int. Cl.
| | | |
|---|---|---|
| H02J 7/00 | (2006.01) | |
| H04R 1/10 | (2006.01) | |
| H02J 50/12 | (2016.01) | |
| H02J 50/40 | (2016.01) | |
| H02J 7/02 | (2016.01) | |

(52) U.S. Cl.
CPC .......... H04R 1/1025 (2013.01); H02J 7/0027 (2013.01); H02J 7/025 (2013.01); H02J 50/12 (2016.02); H02J 50/40 (2016.02); H04R 2420/07 (2013.01)

(58) Field of Classification Search
None
See application file for complete search history.

(56) References Cited

U.S. PATENT DOCUMENTS

| | | |
|---|---|---|
| 7,548,040 B2 | 6/2009 | Lee |
| 9,742,208 B2 | 8/2017 | Stratton |
| 9,998,818 B1 * | 6/2018 | Mitchell ................ H04R 1/028 |
| 10,097,150 B1 * | 10/2018 | Peterson ................ G06F 3/165 |
| 10,112,029 B2 * | 10/2018 | Redfield ................ A61F 7/007 |
| 2001/0036291 A1 * | 11/2001 | Pallai .................... H04R 1/342 |
| | | 381/370 |
| 2011/0116674 A1 | 5/2011 | Asakura |

(Continued)

FOREIGN PATENT DOCUMENTS

| | | |
|---|---|---|
| KR | 10-2007-0033123 A | 3/2007 |
| KR | 10-1268323 B1 | 5/2013 |
| KR | 10-1620628 B1 | 5/2016 |

OTHER PUBLICATIONS

Wirelss Power Consortium, Introduction to the Power Class 0 Specification, Version 1.2.3, Feb. 2017.

(Continued)

*Primary Examiner* — Arun C Williams
(74) *Attorney, Agent, or Firm* — Dicke Billig & Czaja PLLC (57) ABSTRACT

Headsets of the inventive subject matter are configured to stand freely on an outer surface of an earcup, and they incorporate wireless charging in one or more earcups so that the headset can be wirelessly charged while resting on an outer surface of an earcup. To make this charging configuration possible, one or more holding mechanisms are implemented to couple one or both of the fork bodies (e.g., the structure to which an earcup is coupled) to the headband of a headset. Holding mechanisms of the inventive subject matter prevent the headset from toppling over while charging due to rotation of the headband relative to the earcup that the headset is resting on.

11 Claims, 8 Drawing Sheets

(56) References Cited

U.S. PATENT DOCUMENTS

| | | | |
|---|---|---|---|
| 2013/0093254 A1 | 4/2013 | Urano | |
| 2015/0055815 A1* | 2/2015 | Kolton | H04R 1/105 |
| | | | 381/379 |
| 2017/0150245 A1* | 5/2017 | Armstrong | H04R 1/1041 |
| 2017/0195771 A1* | 7/2017 | Hung | H04R 1/1041 |
| 2018/0048953 A1* | 2/2018 | Park | G06F 3/165 |
| 2018/0324515 A1* | 11/2018 | Boesen | H04R 1/1041 |
| 2020/0007971 A1* | 1/2020 | Park | H01M 10/0585 |
| 2020/0162807 A1* | 5/2020 | Lim | H01R 13/6205 |

OTHER PUBLICATIONS

Wireless Power Consortium, The Qi Wireless Power Transfer System, Power Class 0 Specification, Parts 1 and 2: Interface Definitions, Version 1.2.3, Feb. 2017.

Wireless Power Consortium, The Qi Wireless Power Transfer System, Power Class 0 Specification, Part 4: Reference Designs, Version 1.2.3, Feb. 2017.

* cited by examiner

FREE-STANDING WIRELESS-CHARGING HEADSETS

FIELD OF THE INVENTION

The field of the invention is free-standing wireless-charging headsets.

BACKGROUND

The background description includes information that may be useful in understanding the present invention. It is not an admission that any of the information provided in this application is prior art or relevant to the presently claimed invention, or that any publication specifically or implicitly referenced is prior art.

Consumer electronics increasingly feature wireless charging. Wireless charging is often achieved in consumer electronics by inducing magnetic induction, i.e., a time-varying magnetic field that generates an electromotive force in a complementary inductor, though it can also be achieved using RF harvesting and magnetic resonance techniques, all of which have different advantages and disadvantages. As wireless charging technology proliferates, consumers will expect more electronics to incorporate wireless charging. Despite this trend, wireless charging has yet to be incorporated effectively into audio headsets.

Headsets can be used to experience audio in high fidelity, often in the context of video games for the personal computer (also referred to as gaming). Many individuals prefer headsets to other audio systems to experience high quality surround sound audio for a fraction of the cost of purchasing an entire home audio system. Such headsets can also be fitted with microphones to incorporate voice communication. Though headset technology has continued to improve voice and audio quality, other improvements, such as wireless charging, have not been effectively incorporated. As wireless charging becomes standard in many mobile devices, consumers begin to expect wireless charging as a standard feature.

Incorporating wireless charging into a headset presents several unique challenges. Common headsets are an irregular shape that is not suitable for use with wireless charging pads. Prior attempts to incorporate wireless charging into audio equipment have focused on earbuds and other audio equipment that can be placed into a case that incorporates wireless charging. Others have developed solutions that leave room for improvement. For example, U.S. Pat. No. 7,548,040 discloses a headset with speaker transducers that double as a wireless charging coil, and another embodiment that has wireless charging using a separate coil for inductive charging. The '040 patent fails to consider solutions to any of the unique problems presented by incorporating wireless charging into, for example, the earcup of a headset. Further, the location of the inductive charging coil with a speaker coil as described in the '040 patent would render it unusable with available wireless charging technologies.

Another U.S. Pat. No. 9,742,208, discloses a headset capable of wireless charging but fails to disclose a wireless charging mechanism. Instead, the '208 patent includes a vague reference that pogo-pins can be replaced with inductive charging coils, with complementary coils being placed in an earcup. No additional details are provided, and the patent does not disclose solutions to problems necessary to solve to implement such a device in practice.

Neither the '040 patent nor the '208 patent relate to headsets that balance on an earcup to facilitate inductive charging, and neither patent discloses solutions to problems arising in such an implementation.

These and all other extrinsic materials discussed in this application are incorporated by reference in their entirety. Reference in this application is also made to the Qi wireless charging standard, the Qi Wireless Power Transfer System for Power Class 0 Specification, Parts 1 and 2: Interface Definitions, and Part 4: Reference Designs, all of which are hereby incorporated by reference. Where a definition or use of a term in an incorporated reference is inconsistent or contrary to the definition of that term provided in this application, the definition of that term provided in this application applies and the definition of that term in the reference does not apply.

It has yet to be appreciated that wireless charging can be incorporated into a headset that rests on a surface of an earcup while charging.

SUMMARY OF THE INVENTION

The present invention is directed to headsets with wireless charging capabilities. In one aspect of the inventive subject matter, a wireless charging headset is contemplated, comprising: a headband; a fork body coupled with the headband by a holding mechanism; and an earcup coupled with the fork body and comprising an outer surface and wireless charging coils positioned behind the outer surface, thereby enabling the wireless charging headset to wirelessly charge when resting on the outer surface of the earcup. The holding mechanism includes a shaft to couple the headband with the fork body, at least one ball bearing mechanism comprising a spring-loaded ball bearing, and at least one complementary indentation to receive the spring-loaded ball bearing. The holding mechanism is configured to releasably hold the headband in alignment with the fork body, thereby preventing the wireless charging headset from falling when resting on the outer surface of the earcup. And the shaft facilitates rotation of the headband relative to the fork body about a single axis of rotation.

In some embodiments, the outer surface is made at least partially from one or any combination of a rubber and a plastic. The at least one ball bearing mechanism can be coupled with the fork body and in such a configuration the headband includes the at least one complementary indentation. In some embodiments, the ball bearing mechanism can be coupled with the headband and the fork body has the at least one complementary indentation.

In some embodiments, the wireless charging coils are sized and dimensioned to achieve maximum charging efficiency with a complementary charging coil at a power transmission frequency between 87 kHz and 205 kHz.

In some embodiments, both earcups include wireless charging hardware. Thus, a headset of the inventive subject matter can additionally include a second fork body coupled with the headband by a second holding mechanism, a second earcup coupled with the second fork body and comprising a second outer surface and second wireless charging coils positioned behind the second outer surface so that the wireless charging headset can wirelessly charge when resting on the second outer surface of the second earcup where the second holding mechanism includes a second shaft to couple the headband with the second fork body, at least a second ball bearing mechanism comprising a second spring-loaded ball bearing, and at least a second complementary indentation to receive the second spring-loaded ball bearing. In such embodiments, the second holding mechanism is configured to releasably hold the headband in alignment with the second fork body to prevent the wireless charging headset from falling over when resting on the second outer surface of the second earcup, and the second shaft facilitates rotation of the headband relative to the second fork body about a second single axis of rotation.

In another aspect of the inventive subject matter, a free-standing headset is contemplated. A free-standing headset of the inventive subject matter includes: a headband; a fork body coupled with the headband by a holding mechanism; and an earcup coupled with the fork body and comprising a flat outer surface. The holding mechanism can include a shaft to couple the headband with the fork body, at least one ball bearing mechanism comprising a spring-loaded ball bearing, and at least one complementary indentation to receive the spring-loaded ball bearing. The holding mechanism is configured to releasably hold the headband in alignment with the fork body to prevent the free-standing headset from falling over when resting on the outer surface of the earcup, and the shaft facilitates rotation of the headband relative to the fork body about a single axis of rotation.

In some embodiments, the outer surface is created at least partially with one or a combination of a rubber and a plastic. The at least one ball bearing mechanism can be coupled with the fork body, and, in some embodiments, the headband comprises the at least one complementary indentation. In some embodiments, the ball bearing mechanism can be coupled with the headband and the fork body can include the at least one complementary indentation, or vice versa. The ball bearing mechanism is offset from the shaft.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing ranges, quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

The following description includes information that may be useful in understanding the present invention. It is not an admission that any of the information provided in this application is prior art or relevant to the presently claimed invention, or that any publication specifically or implicitly referenced is prior art.

Figure 1:
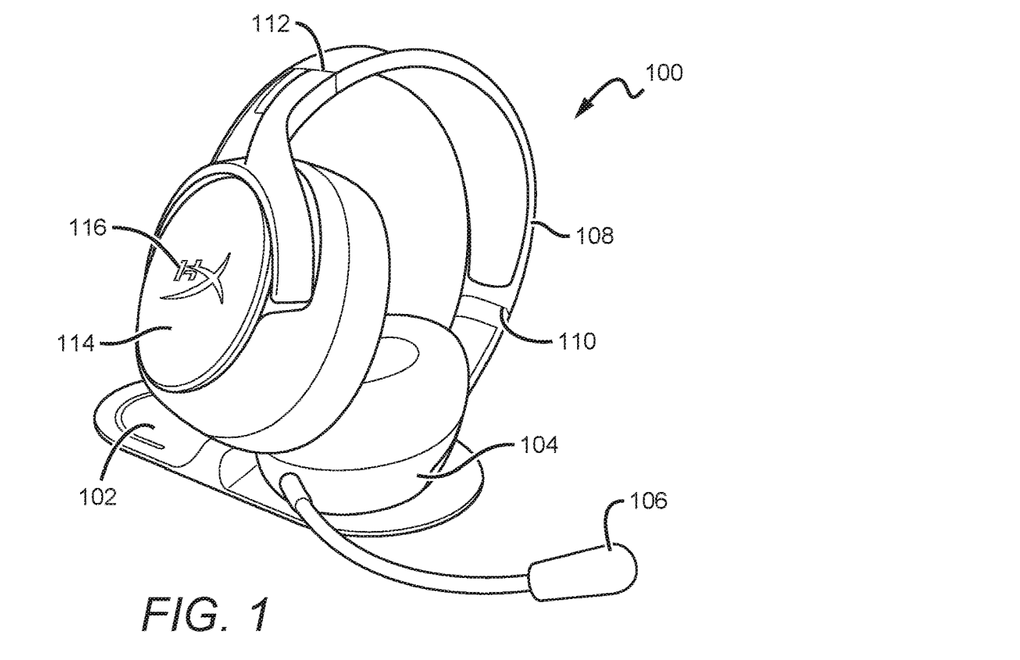
FIG. 1 shows a headset of the inventive subject matter resting on a charging pad.
Figure 2:
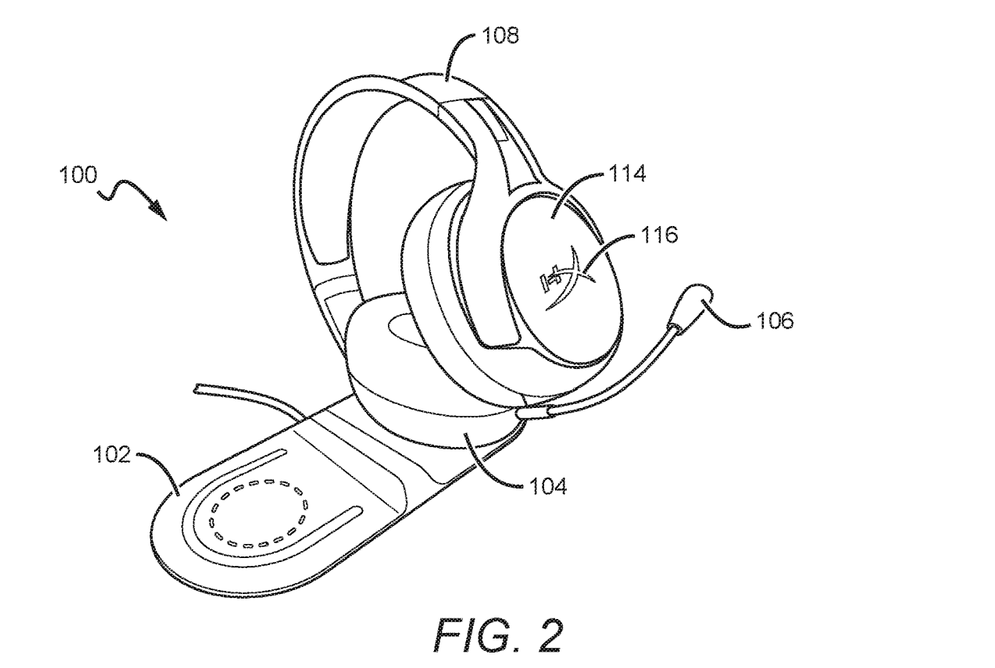
FIG. 2 shows a headset of the inventive subject matter resting on a charging pad.

Headsets of the inventive subject matter feature wireless charging and a holding mechanism incorporated into the headband to facilitate free-standing charging while resting on an outer surface of an earcup without compromising user comfort when the headset is worn. The holding mechanisms can release while worn to allow for rotation of the earcups relative to the headband to improve long-term user comfort, while also providing sufficient resistance to rotation to hold the earcups in place relative to the headband when the headset is set down to charge on an outer surface of an earcup. For example, gamers often spend many hours at a time wearing headsets both to experience high quality audio and to communicate with teammates. Comfort in such a situation is critical for any headset, and a headset that does not offer earcup rotation relative to a headband sacrifices comfort. Because simplicity, comfort, and ease-of-use are paramount, headsets of the inventive subject matter minimize hinges and other moving parts without sacrificing function to improve long-term durability, wearer comfort, and consumer desirability. An embodiment of a headset is shown in FIGS. 1 & 2. In these figures, the headset 100 is shown resting on a charging pad 102. The embodiment shown in FIGS. 1 & 2 is resting on an outer surface of an earcup 104. The headset 100 also includes an optional microphone 106 to enable voice communication in the context of, e.g., gaming.

Figure 3:
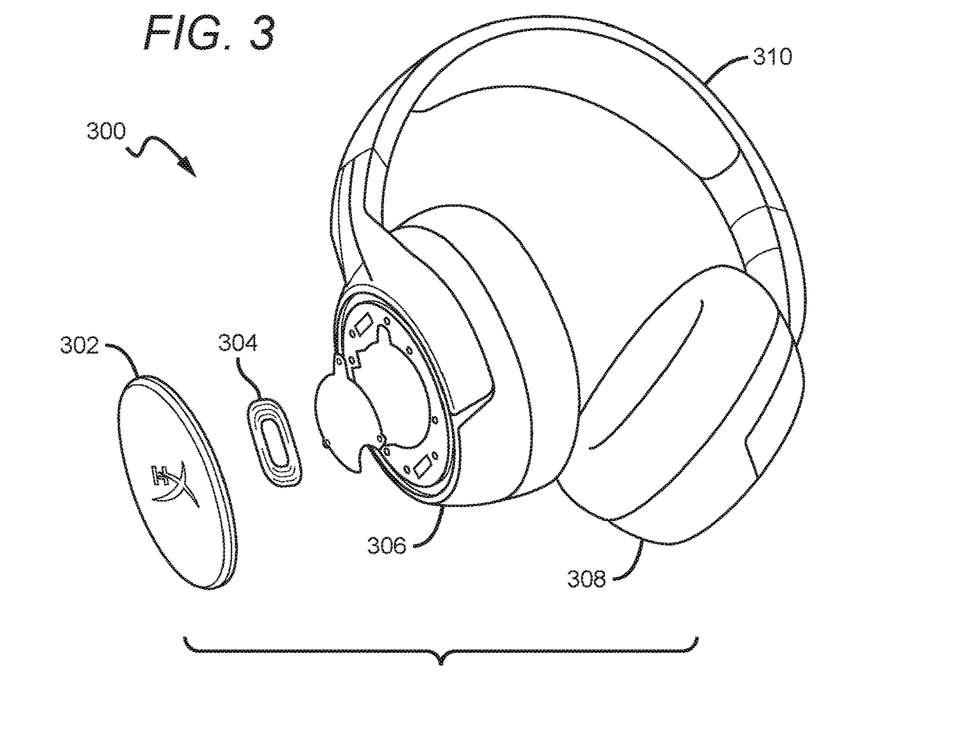
FIG. 3 shows a headset with an earcup in an exploded view showing inductive charging coils.

Headsets of the inventive subject matter thus include wireless charging capabilities, having coils to facilitate inductive charging located in one or both earcups. FIG. 3 shows a headset 300 with an earcup 306 in an exploded view showing an outer covering 302 and coiled wires 304. Coiled wires 304 are located in the earcup 306 so that the headset can be charged while resting on the outer surface 302 of the earcup 306. Ordinary headsets have earcups coupled with the headband such that the earcups can rotate about an axis of rotation in the headband to improve the fit of the earcups when the headset is in use. But ordinary headsets are not designed to stand upright while resting on an outer surface of an earcup. When ordinary headsets are set on an outer surface of an earcup, they fall over, often as a result of rotation about the axis of rotation in the coupling between the earcup and the headband. In other instances, ordinary headsets either don't have earcup outer surfaces that are designed to create a stable platform to hold the headsets up when at rest, or they are otherwise not designed to be stable when resting on an earcup.

Embodiments of the inventive subject matter have addressed these problems by, for example, including a specialized holding mechanism in the coupling between the headband and one or both earcups. Holding mechanisms contemplated in this application are configured to hold the headband and earcup opposite the charging earcup (e.g., the earcup that the headband rests on while charging) in place relative to the charging earcup to improve stability when the headset is at rest on an outer surface of the charging earcup (e.g., as shown in FIGS. 1 & 2). At the same time, these contemplated holding mechanisms do not compromise the flexibility required for user comfort.

Headbands of the inventive subject matter provide structural stability during both charging and ordinary use. In some embodiments, wiring can pass through the headband, including wiring to couple a charging mechanism with a battery and wiring sufficient to allow the drivers in both earcups to function. In some embodiments, the headband includes extensions that allow users to adjust a headset's fit to their heads. In some embodiments, headbands of the inventive subject matter do not include any hinges, thereby reducing complexity and improving structural integrity when the headset is resting on an earcup. And, as mentioned above, headbands of the inventive subject matter include one or more holding mechanisms to increase stability when the headsets are at rest on an earcup (e.g., to charge, as shown in FIGS. 1 & 2) by resisting rotation of the headband relative to an earcup mounted to a fork body. Holding mechanisms can hold the headband and elevated earcup in a particular position and orientation relative to the earcup that the headset is resting on (e.g., the bottom earcup) to, e.g., keep the center of mass of the headset over the outer surface of the bottom earcup that the headset is resting on.

The outer covering 302 of the earcup 306 can also be referred to as the flat surface of the earcup in embodiments where the outer covering 302 is flat. In general, having a flat outer surface 302 is advantageous to improve inductive charging because it allows coils 304 to be in closer proximity to charging coils in a charging pad (e.g., charging pad 102). Coils 304 can be compliant with different wireless charging protocols, including near-field protocols such as Qi, PMA, Frequency 326, and Typhoon.

The outer surface can be made from a variety of different materials so long as the material selected does not interfere with inductive charging. Outer surface 302 can be made from any non-metallic, non-ferrous materials, such as one or any combination of rubber, plastic, composite, leather, etc. In some embodiments, outer surface 302 includes a material that has a high coefficient of friction (e.g., a rubber) to help prevent the headset from sliding when the outer surface 302 is resting on a charging pad. Increased friction with the charging pad helps maintain alignment of coils 304. The coefficient of friction (e.g., of static friction) between the outer surface 302 and a surface of a charging pad (e.g., charging pad 102 shown in FIGS. 1 & 2) can be, for example, between 0.3 and 1.5.

For wireless charging incorporated into a headset, an ideal operating frequency is typically in the range of 87 to 205 kHz, with peak resonance near 100 kHz. In some embodiments, operating frequency can be as low as 50 kHz and as high as 500 kHz-1 MHz.

Different embodiments of the outer surface 302 can have different thicknesses. The outer surface 302 can range in thickness from 0.5 mm to 10 mm. In some embodiments, the outer surface can be as thin as 0.1 mm depending on the stiffness of the outer surface material (e.g., when thinner outer surfaces are implemented, a stiffer material can help to maintain structural integrity). Efficient power transfer between coils 304 and coils in a wireless charging pad can occur at distances between about 5 mm up to about 40 mm, so the outer surface 302 must not be so thick as to prevent the coils 304 from being able to efficiently receive power from a wireless charging pad. Coils 304 can be configured to receive between 5 W and 30 W of load power (e.g., 5 W, 8 W, 10 W, 12 W, and 15 W). In some embodiments, coils 304 have an outer diameter of 40 mm, but outer diameters ranging from 10 mm to 100 mm are also contemplated. In some ideal configurations, a power transfer coil in the headset will have the same dimensions as the power transfer coil in a charging pad, the headset power transfer coil will be perfectly aligned with the power transfer coil in the pad, the distance between coils will be less than the diameter of the coils, and the coils will be shielded externally by ferrite. In practice, ideal conditions may differ from those described above, dependent on factors such as compliance with various wireless charging standard (e.g., Qi) or other mechanical constraints. For example, size of a power transfer coil may be determined according to a wireless transfer protocol, while the size of a receiver coil may not (e.g., the receiver coil's size may be constrained by housing dimensions, preventing it from being the same size as the power transfer coil). Such a configuration may nevertheless be the most ideal considering the various constraints that each coil may be subject to.

Before charging begins, the charging pad and headset communicate to establish that the headset is capable of being charged, whether it needs to be charged, and how much power is required. For example, if the headset is capable of receiving only 5 W but is placed on a 15 W power transmitter, it will instruct the power transmitter that it is capable of receiving only 5 W. The power transmitter would then transmit sufficient power such that no more than 5 W are received at the receiver coil. This enables power transfer between the power transmitter and the receiver. In some embodiments, the frequency response of the power transmitter/headset system will have a resonance near the lower end of an operating frequency of 87 to 205 kHz. The power transmitter may modulate the frequency to transmit more or less power, with a frequency closer to resonance transmitting higher power. Frequency modulation by frequency shift keying (FSK) can also provide synchronization and other information to the headset receiver. The digital communication channel can also provide an SSID, Bluetooth link, or a unique ID used to enable location-based functionality in the headset, such as volume or sound settings based on location. Further, to avoid inadvertent heating of foreign objects, the communications channel is bidirectional so that the power transmitter can verify that a headset, as opposed to a foreign object, has been placed on the wireless charging pad.

As mentioned, the digital communications channel in the headset is capable of sending and receiving different digital packets through frequency shift keying. A communications channel is opened by proceeding through a selection phase, a ping phase, an identification and configuration phase, a negotiation phase (optional), and a calibration phase (optional). When the communications channel has been opened, the system moves into the power transfer phase.

In the selection phase, the headset receiver determines whether it will proceed to the ping phase after detecting a power transmitter. That determination can be made by detecting whether a received power is higher than a threshold power. If a positive determination is made, the headset receiver proceeds to the ping phase.

In the ping phase, the power transmitter sends a digital ping. When received by the headset's power receiver, a signal strength packet is sent in response, or, if no power is desired, an end power transfer packet. After a signal strength packet, the headset power receiver enters the identification and configuration phase. In this phase, the headset power receiver immediately transmits an identification packet, up to seven optional configuration packets, and a configuration packet.

Implementation of wireless charging can be accomplished by receiving an emitted charge (e.g., from a charging pad) at a receiver (e.g., in a wireless-charging headset). Some embodiments are compatible with Qi standard communication to establish the connection needed for Qi charging. Power obtained through the receiver can then be routed to a power management chip within a headset that distributes the power to a rechargeable battery. In some embodiments, the power management chip also controls and provides power to a visual indicator (e.g., one or more LEDs as discussed in this application) to notify the users of a headset status. In some embodiments, power management may also be provided as part of a single-chip solution.

In some embodiments, the headset can detect alignment between coils 304 and a power transmitter by a signal sent from the headset power receiver coil control circuitry to a separate controller that operates a feedback response to indicate that alignment has been achieved. The alignment detection signal sent to a feedback controller can be, for example, triggered by changes in the operating state of the headset power receiver, such as entering a power transfer state.

In some embodiments, power can be delivered via wireless transmission to a power management chip without interruption, even if the battery to be charged is full. In such embodiments, instead of transmitting an end power transfer packet in response to a digital ping when the headset battery is full, the headset power receiver coil control circuitry will instead transmit a signal strength packet. This can also enable implementation of discrete headset power receiver coil control circuitry because in such embodiments it would be unnecessary for the power receiver coil control circuitry to read the status of the battery. Because power delivery is uninterrupted, headsets can give visual indication that they are charged or that they are aligned with charging pad despite, e.g., being turned off. In some embodiments, when a headset is fully charged, a power management chip detects that charge state and sends a signal to the wireless charging receiver chip (e.g., a Qi-charging receiver chip). In response, the receiver cuts off battery charging. The power management chip can also trigger a full-charge indication to alert a user that the headset is fully charged.

To aid with alignment with the wireless charging pad, the headset can then provide feedback to the user in several different ways. For example, the speakers on the headset can provide audio feedback to indicate alignment. As another example, a tactile feedback device can be incorporated into the headset to provide a vibration or other tactile response when alignment is achieved. As yet another example, indicator lights, as described below, can provide visual feedback to indicate alignment and charging. A null period must follow transmission of each individual packet. To ensure packet integrity in the physical link layer, a checksum is calculated through an EXCLUSIVE OR (XOR) operation of a packet header with each data byte in the packet. The checksum is then appended to the end of the packet.

It is also contemplated that indicator lights can be included in embodiments to indicate battery level, charging status, wireless connectivity, etc. For example, in the embodiment shown in FIG. 1, the logo 116 on the elevated earcup 114 can be backlit by one or more light sources (e.g., LEDs). When the headset 100 is on a charging pad 102, the logo 116 can light up with a particular color, intensity, or combination thereof to indicate that the headset is charging. In some embodiments, the indicator lights behind the logo 116 can transition from one color to another to indicate battery charge level. For example, if the battery is low, the indicator lights behind the logo 116 can start with red and transition to green as the battery charge level goes up.

In some embodiments, like the one shown in FIG. 3, the charging coils 304 are located in one earcup 306 while a battery is located in the other earcup 308, with wires passing through the headband 310 to couple the battery with the charging coils 304. Having the battery located in an earcup opposite the charging coils with the charging coils' accompanying electronics can improve weight balance between the two earcups despite the asymmetric configuration. In some embodiments, both earcups can have a charging coil and a battery in the same earcup, thereby increasing battery capacity while also maintaining weight balance between the two earcups.

The following disclosure regarding FIGS. 4-12B relate to holding mechanisms of the inventive subject matter. In each embodiment, certain components are described as being coupled with either a fork body or a headband. It is contemplated that each component in a hold mechanism that is described as being coupled with (or disposed in, etc.) a fork body can instead be coupled with a headband and each component described as being coupled with a headband can instead be coupled with a fork body, thus changing the orientation of the holding mechanism with respect to the headset in which it is disposed. For example, in FIG. 4 the shaft 402 can be coupled with the fork body 408 instead of the headband 410, with the ball bearing mechanisms 404 & 406 being coupled with the headband 410 instead of the fork body 408, in effect inversing the orientation of the holding mechanism as it is depicted in FIGS. 4-6B. The same is true for the holding mechanisms shown in FIGS. 7-9B and FIGS. 10-12B.

Figure 4:
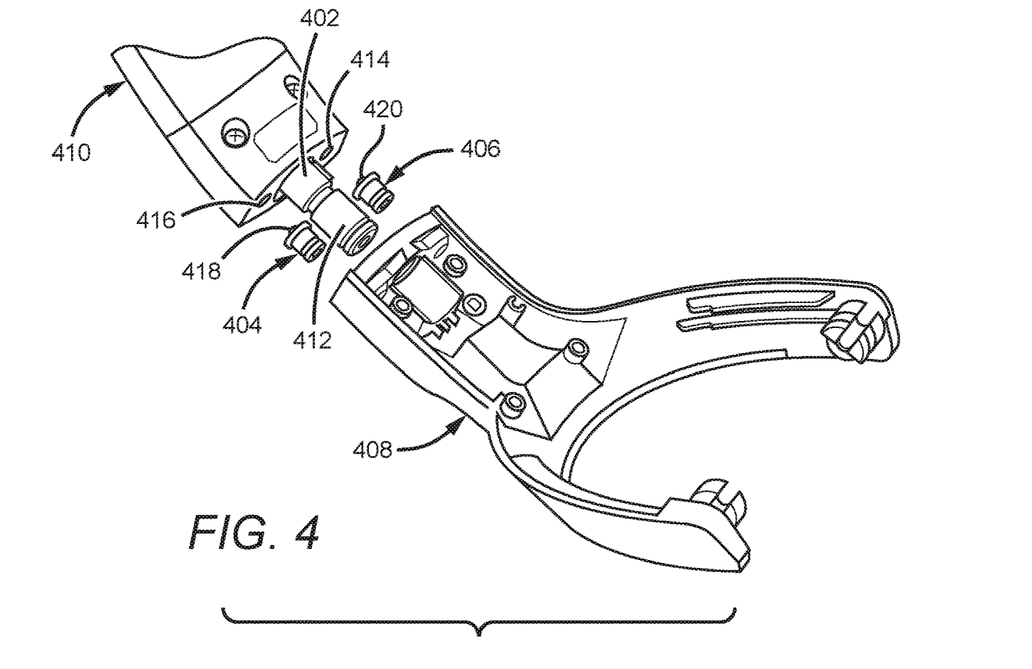
FIG. 4 shows an exploded view of a holding mechanism embodiment.

One embodiment of a holding mechanism is shown in FIGS. 4-6B. As shown in FIG. 4, the holding mechanism includes a shaft 402, two ball bearing mechanisms 404 & 406, and a fork body 408. The shaft 402 is shown coupled with the headband 410, and the shaft 402 protrudes outward from the headband 410 to be received by a complementary shaft fitting 412 that is disposed within the fork body 408 upon assembly.

Figure 5B:
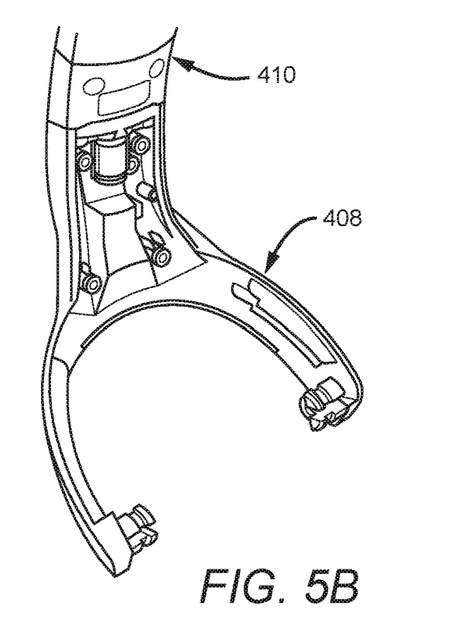
FIG. 5B shows the holding mechanism of FIG. 4 when the headband and fork body are aligned.
Figures 6A, 6B:
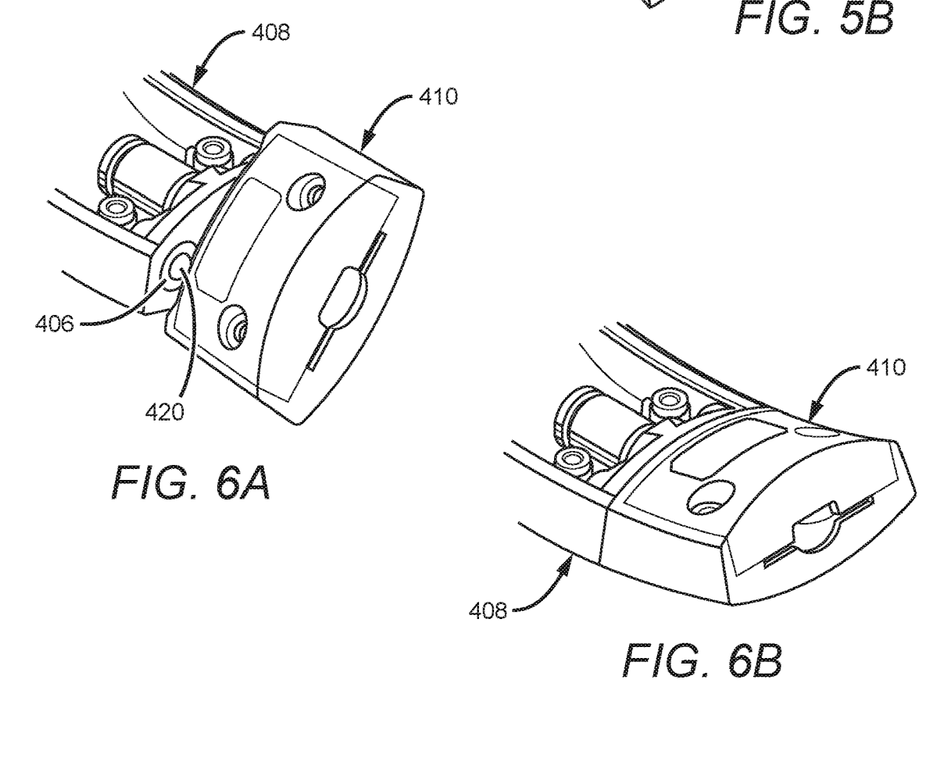
FIG. 6A shows a closer view of the holding mechanism of FIG. 4 when the headband and fork body are unaligned.
FIG. 6B shows a closer view of the holding mechanism of FIG. 4 when the headband and fork body are aligned.

When assembled, the fork body 408 can then rotate relative to the headband 410 about an axis of rotation that is defined by the coupling of the shaft 402 and shaft fitting 412. Free rotation of the fork body 408 about a fixed axis relative to the headband 410 helps improve the fit of the earcups on a user's head but results in the headset falling over when resting on an earcup, e.g., to charge. To solve this issue, two ball bearing mechanisms 404 & 406 are included on either side of the shaft fitting, and two complementary indentations 414 & 416 are included on the end of the headband 410. Each ball bearing mechanism 404 & 406 includes a ball bearing 418 & 420 that is spring-loaded to protrude out of the ball bearing mechanisms 404 & 406. Indentations 414 & 416 are sized and dimensioned to receive the ball bearings 418 & 420 when the fork body 408 is aligned with the headband 410 (e.g., as shown in FIGS. 5B & 6B), and when the ball bearings 418 & 420 protrude into the indentations 414 & 416. Thus, when the ball bearings 418 & 420 protrude into the indentations 414 & 416, the fork body 408 is held stationary relative to the headband 410. For the fork body 408 to rotate relative to the headband 410 starting from an aligned position, sufficient rotational force must be applied to cause both ball bearings 418 & 420 to push down into the ball bearing mechanisms 404 & 406, thereby releasing the fork body 408 to rotate relative to the headband 410.

Figure 5A:
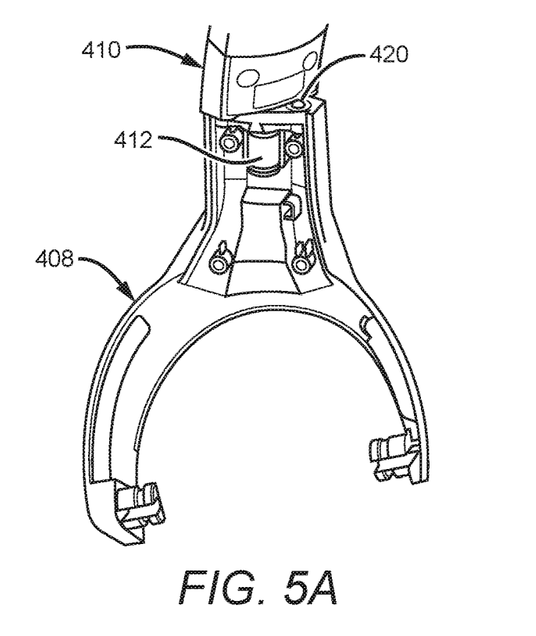
FIG. 5A shows the holding mechanism of FIG. 4 when the headband and fork body are unaligned.

FIG. 5A shows the fork body 408 when it is transitioning out of alignment with headband 410. In the position shown in FIG. 5A, the ball bearings 418 (not visible) & 420 are pressed into their respective ball bearing mechanisms 404 & 406 (not visible). When the fork body 408 is not aligned with the headband 410 and when the ball bearings 418 & 420 are pressed into their respective ball bearing mechanisms 404 & 406, the fork body 408 is free to rotate relative to the headband 410. FIG. 5B, on the other hand, shows the fork body 408 in alignment with the headband 410. In this configuration, ball bearings 418 & 420 protrude into the indentations 414 & 416 to hold the fork body 408 in place relative to the headband 410.

FIGS. 6A & 6B show a closeup of an end of the headband 410. FIG. 6A shows the fork body 408 rotated relative to the headband 410 such that ball bearing 420 is visible and protruded out of the ball bearing mechanism 406. Ball bearing 420 protrudes in this manner only when the fork body 408 is rotated relative to the headband 410 to a sufficient degree that the ball bearing 420 is no longer being held in the ball bearing mechanism 406 by the headband 410.

Figure 7:
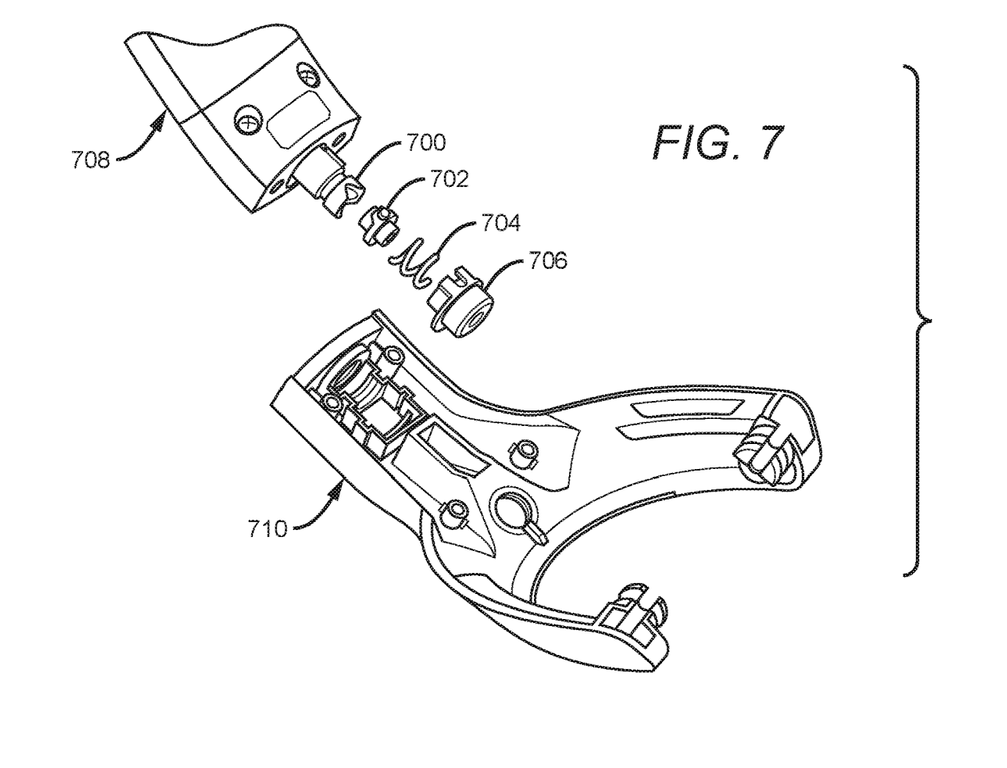
FIG. 7 shows an exploded view of another holding mechanism embodiment.

Another embodiment of a holding mechanism is shown in FIGS. 7-9B. As shown in FIG. 7, the holding mechanism includes a shaft 700, a piston 702, a spring 704, and a cylinder 706. The shaft 700 is shown coupled with the headband 708, and the shaft 702 protrudes outward from the headband 708 to mate with the piston 702 that is disposed, upon assembly, within the fork body 708 along with the spring 704 and cylinder 706.

Figure 8A:
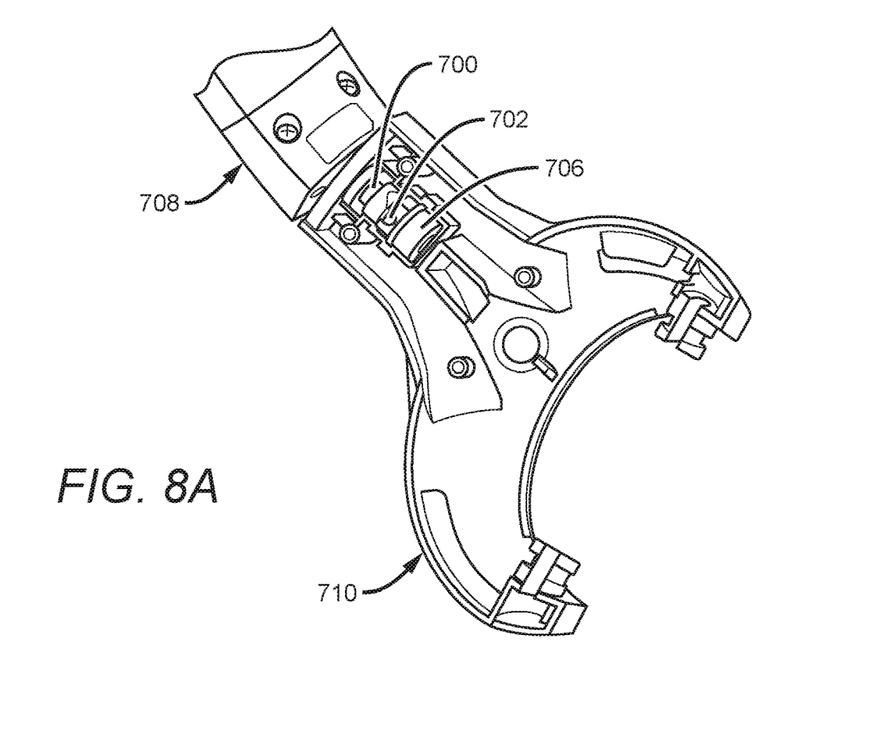
FIG. 8A shows the holding mechanism of FIG. 7 when the headband and fork body are unaligned.
Figure 8B:
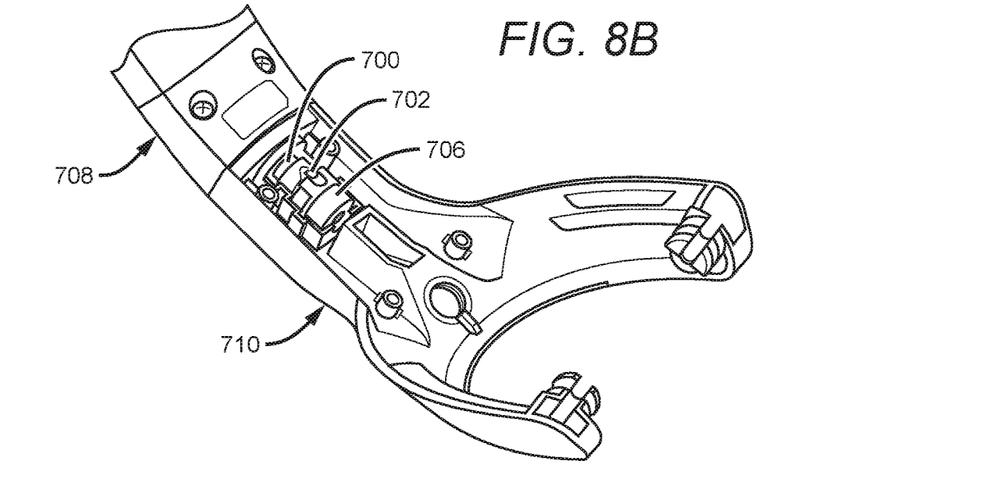
FIG. 8B shows the holding mechanism of FIG. 7 when the headband and fork body are aligned.
Figure 9A:
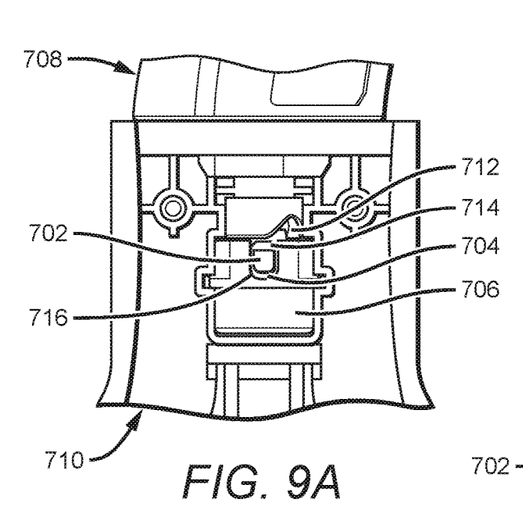
FIG. 9A shows a closer view of the holding mechanism of FIG. 7 when the headband and fork body are unaligned.
Figure 9B:
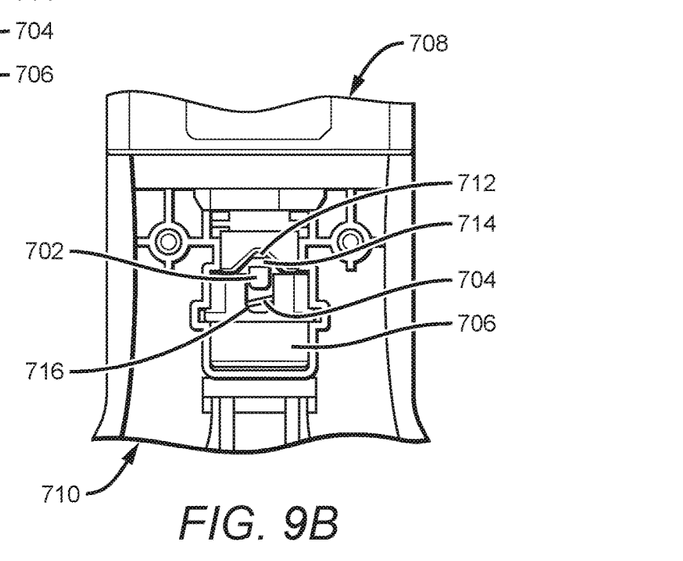
FIG. 9B shows a closer view of the holding mechanism of FIG. 7 when the headband and fork body are aligned.

Like the holding mechanism shown in FIGS. 4-6B, the holding mechanism shown in FIGS. 7-9B functions to hold the headband 708 in alignment with the fork body 710 as shown in FIGS. 8B & 9B. The embodiment shown in FIGS. 7-9B includes a shaft 700 that has a notch 712. Piston 702 has a corresponding detent 714 that fits into the notch 712 when the headband 708 and the fork body 710 are aligned. When the headband 708 and fork body 710 are in alignment, the spring 704 presses the piston 702 away from the cylinder 706 such that the detent 714 rests within the notch 712. FIGS. 8A & 9A show the fork body 710 out of alignment with the headband 708. When the fork body 710 moves out of alignment with the headband 708, the detent 714 interacts with the notch 712 to press the piston 702 toward the cylinder 706 by compressing the spring 704. As seen best in FIG. 9A, the piston 702 is constrained so that it does not rotate relative to the cylinder 706 by a protrusion from the piston 702 that fits into a slot in the cylinder 706.

FIGS. 8B & 9B show the fork body 710 in alignment with the headband 708. When the fork body 710 moves into alignment with the headband 708, the detent 714 interacts with the notch 712 such that the spring 704 in between the piston 702 and the cylinder 706 pushes the piston 702 toward the shaft causing the detent 714 to move into the notch 712. When detent 714 is pressed into the notch 712, interactions between the angled surfaces of the detent 714 and angled surfaces of the notch 712 create resistance to rotation. For the fork body 710 to rotate relative to the headband 708 from a position where the fork body 710 is aligned with the headband 708, the fork body 710 must be turned with sufficient force to cause the angled surface of the notch 712 to interact with the detent 714 to push the entire piston 702 toward the cylinder, thereby releasing the fork body 710 and headband 708 to rotate more easily relative to each other. As seen best in FIG. 9A, the piston 702 is constrained so that it does not rotate relative to the cylinder 706 by a protrusion from the piston 702 that fits into a slot 716 in the cylinder 706.

Figure 10:
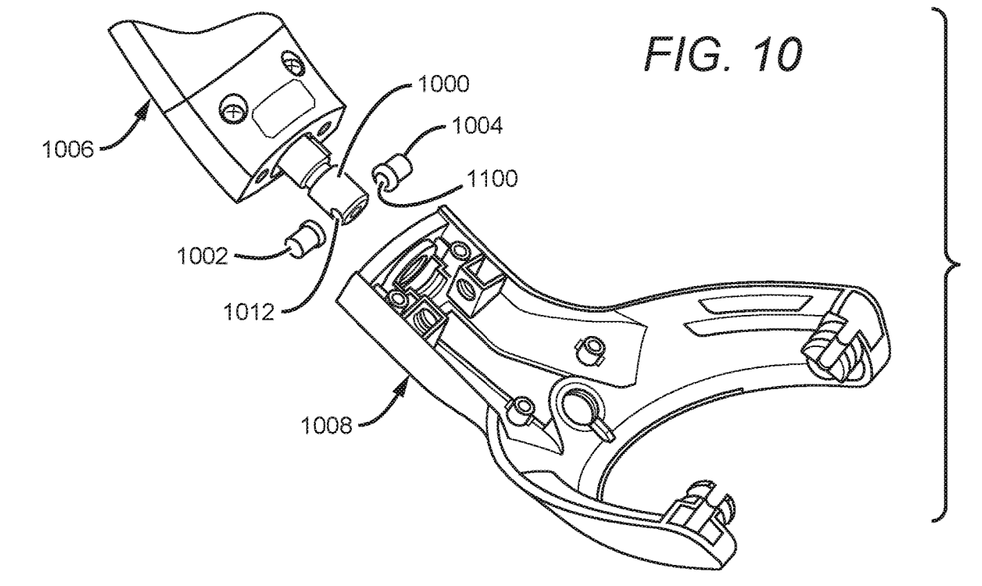
FIG. 10 shows an exploded view of another holding mechanism embodiment.
Figure 11A:
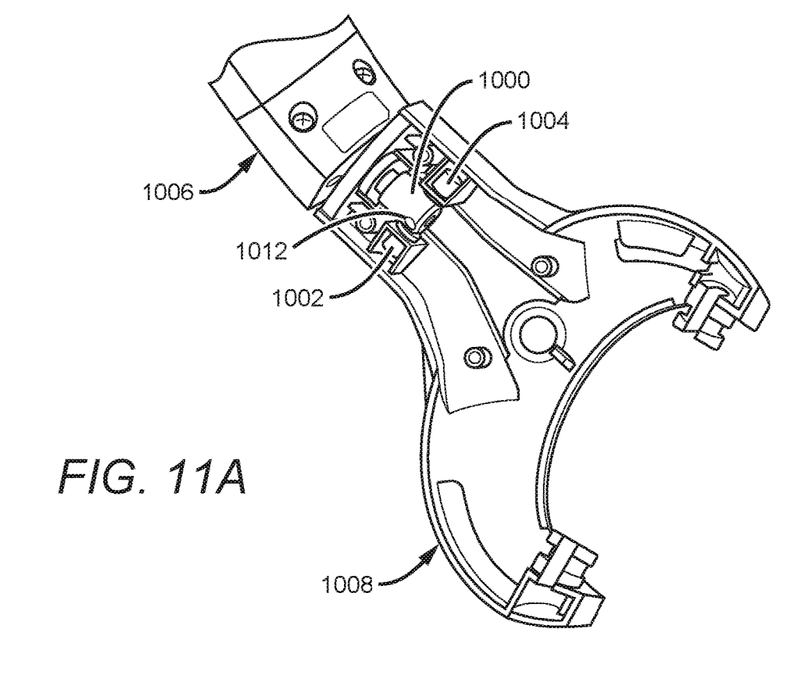
FIG. 11A shows the holding mechanism of FIG. 10 when the headband and fork body are unaligned.
Figure 11B:
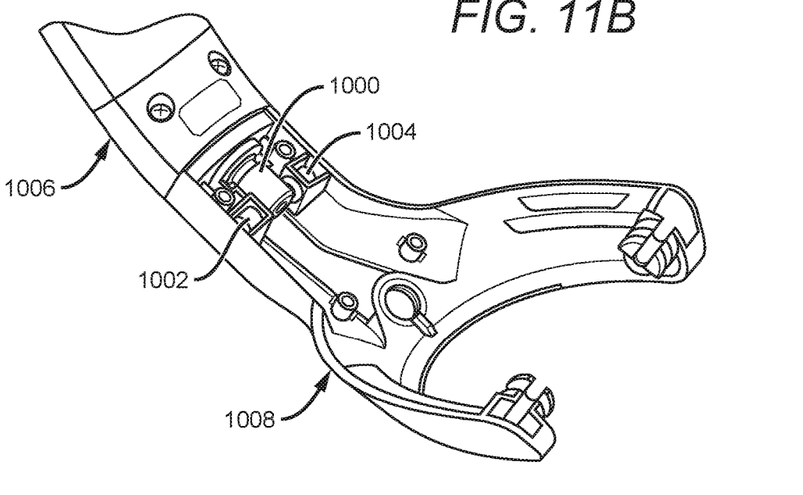
FIG. 11B shows the holding mechanism of FIG. 10 when the headband and fork body are aligned.
Figure 12A:
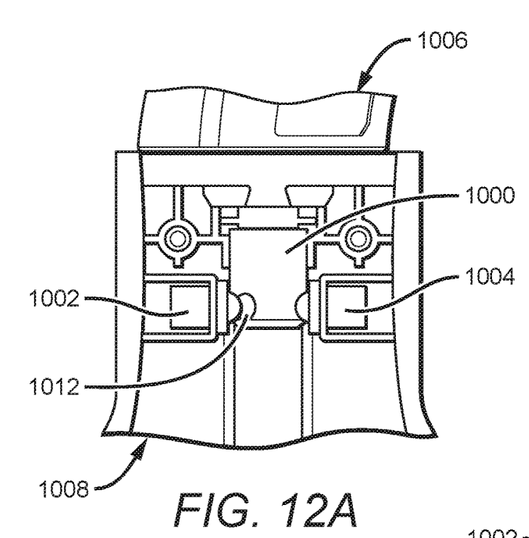
FIG. 12A shows a closer view of the holding mechanism of FIG. 10 when the headband and fork body are unaligned.
Figure 12B:
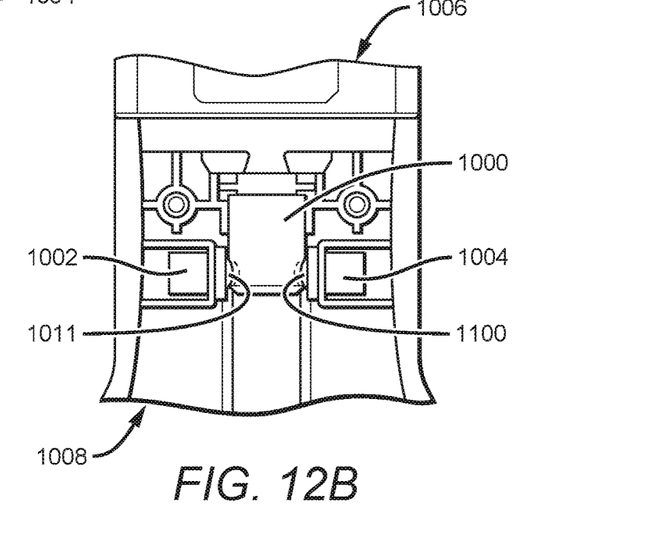
FIG. 12B shows a closer view of the holding mechanism of FIG. 10 when the headband and fork body are aligned.

Another embodiment of the holding mechanism is shown in FIGS. 11-12B. As shown in FIG. 10, the mechanism includes a shaft 1000 and two ball bearing mechanisms 1002 & 1004. The shaft 1000 is coupled with the headband 1006 and the ball bearing mechanisms 1002 & 1004 are coupled with the fork body 1008. The ball bearing mechanisms 1002 & 1004 are similar to those include in the embodiment described above with respect to FIGS. 4-6B wherein each includes a small ball bearing that is spring-loaded to protrude from the mechanism's body. Ball bearing 1100 is visible in mechanism 1004, while the ball bearing in mechanism 1002 is not visible due to the angle that the mechanism is shown in FIG. 10.

The shaft 1000 includes indentations on either side. Indentation 1012 is shown in FIG. 10, while the indentation on the opposite side is not visible in the Figure, though it is symmetric to indentation 1012 in terms of position, depth, etc. Each indentation is sized and dimensioned to receive the ball bearing of the ball bearing mechanisms 1002 & 1004 when the fork body 1006 is aligned with the headband 1006. Thus, the indentations have radii of curvature that are greater than or equal to the radii of curvature of the portions of the ball bearings that protrude into the indentations when the headband 1006 is aligned with the fork body 1008.

FIGS. 11A & 12A each show the fork body 1008 when it is not aligned with the headband 1006. In both of these figures, indentation 1012 is visible because both ball bearing mechanisms 1002 & 1004, which are coupled to and rotate with the fork body 1008, are not in a position for the ball bearings protruding from the ball bearing mechanisms 1002 & 1004 to press into the indentations. FIGS. 11B & 12B each show the fork body 1008 when it is aligned with the headband 1006. In both of these figures, neither indentation is visible because both ball bearing mechanisms 1002 & 1004, which are coupled to and rotate with the fork body 1008, are in a position for the ball bearings protruding from the ball bearing mechanisms 1002 & 1004 to press into the indentations, thereby holding the headband 1006 in alignment with the fork body 1008.

As with the other holding mechanism embodiments described in this application, when the fork body 1008 is aligned with the headband 1006, the holding mechanism prevents the fork body 1008 from freely rotating out of alignment with the headband 1006. For the fork body 1008 to rotate out of alignment with the headband 1006, sufficient force must be applied to cause the ball bearings to interact with the indentations such that the ball bearings are pressed into the ball bearing mechanisms 1002 & 1004, allowing the fork body 1008 to rotate. FIG. 12B, which shows the fork body 1008 and the headband 1006 in alignment, shows both ball bearings 1100 & 1011 pressed into respective indentations on the shaft. This view shows the ball bearings 1100 & 1011 because it makes at least a portion of the shaft 1000 transparent for purposes of demonstrating how the ball bearing mechanisms 1002 & 1004 hold the fork body 1008 in alignment with the headband 1006.

With one or more holding mechanisms incorporated into headsets of the inventive subject matter, headsets are able to rest on a bottom earcup 106 with the headband 108 and opposite earcup 114 elevated as shown in FIGS. 1 & 2. The holding mechanism, which is incorporated at least into the coupling 110 that joins the headband to the bottom earcup 104, prevents the headband 108 and the upper earcup 114 from falling over while the headset is at rest on the bottom earcup 106. It is also contemplated that a holding mechanism can be incorporated into the coupling 114 between the upper earcup 114 and the headband 108 since, in some embodiments, charging coils can be incorporated into either or both of the upper earcup 114 and the bottom earcup 104. In embodiments with charging coils in both earcups, the headset can be charged by setting it down on a charging pad with either earcup on the bottom. In such embodiments, holding mechanisms are included into both couplings 110 & 112 so that the headset can remain upright regardless of the earcup on which it rests.

Figure 13:
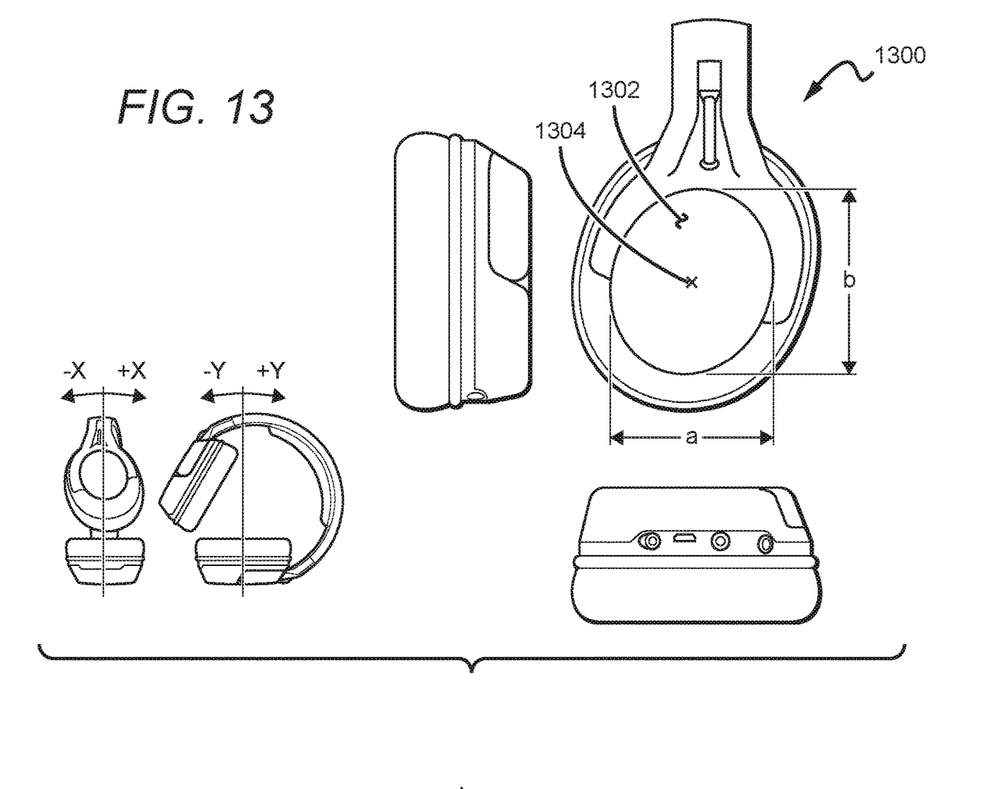
FIG. 13 shows an earcup of a headset with an accompanying coordinate system.

Stability of a headset at rest on an earcup can be adjusted in several ways. FIG. 13 shows several views of an earcup 1300 with accompanying figures to define X and Y axes (these axes apply to the headset depicted in FIGS. 14A-14C as well). The flat surface 1302 of the earcup 1300 (the surface on which the headset rests, e.g., during charging), can have different surface areas and different geometries to change the headset's stability when at rest. As shown in FIG. 13, the flat surface 1302 is elliptical in shape, though any number of different geometries are contemplated (e.g., square, rectangular, polygonal, irregular, etc.). Having a flat surface 1302 on the earcup 1300 can be preferable to improve the headset's ability to wirelessly charge, since proximity of coiled wires in the earcup to the coiled wires in a charging pad improves efficiency of inductive charging.

Flat surface 1302 can be measured according to lengths a and b. Magnitudes of a and b, among other factors, have an impact on the angles at which the headset tips over. Table 1 shows tipping angles for headsets having different a and b magnitudes.

TABLE 1

|  | "X" tipping angle | | "Y" tipping angle | |
|---|---|---|---|---|
| a = 58.7 mm<br>b = 68.5 mm | −17° | +21° | −20° | +24° |
| a = 64.6 mm<br>b = 75.4 mm | −18° | +22° | −22° | +26° |
| a = 70.5 mm<br>b = 82.2 mm | −20° | +24° | −24° | +28° |

Although values for a and b are specific to the geometry of the flat surface of the earcups shown in this application, it is contemplated that earcups of the inventive subject matter can be formed to have any variety of shapes, sizes, textures, etc. included on the surface on which the headset can rest (e.g., the flat surface 1302 as shown in FIG. 13). Moreover, it is contemplated that both a and b can range from 30-120 mm, which inherently includes any geometries that can be expressed using a width (a) and height (b) including rectangles, squares, circles, ellipses, and so on. This geometry not only achieves stability but also creates enough space for wireless charging capabilities. The centroid of the flat surface 1302 is indicated by reference numeral 1304. Stability of a headset at rest on an earcup can be optimized, for example, by ensuring that a line passing through both the headset's center of gravity and the centroid 1304 of the flat surface 1302 is vertical. The closer such a line can be to vertical while still passing through both the center of gravity and an earcup surface's centroid, the more stable a headset will be. Of course, surface area of the flat surface 1302 can also play a factor in stability. If too small, a headset will readily tip over, but if too large, the headset's earcups may be ungainly or foster an unappealing aesthetic.

Figure 14A:
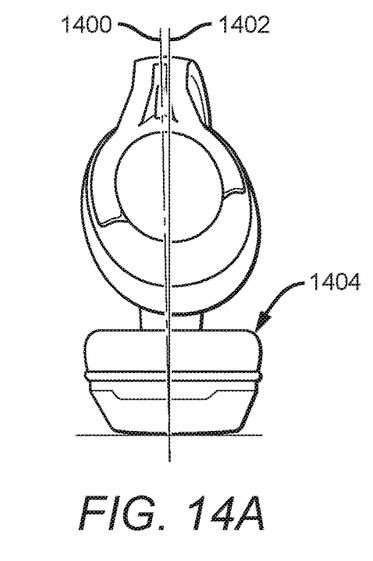
FIGS. 14A-14C show a method of optimizing an off-balance headset for stability.
Figure 14B:
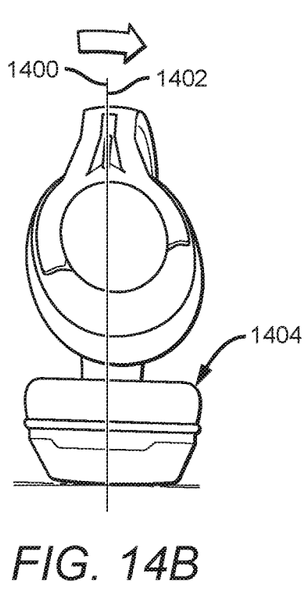
Figure 14C:
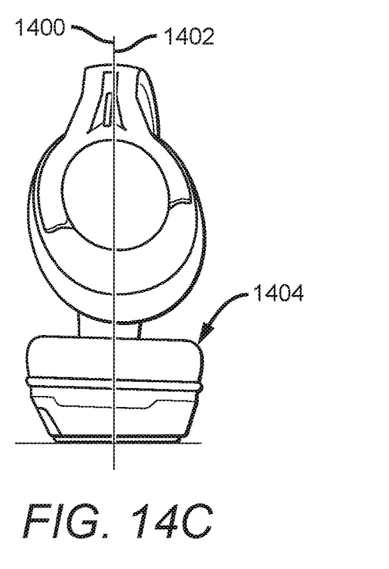

FIGS. 14A-14C show a line passing through both the center of gravity and the centroid of a headset's earcup 1404 (the center of gravity line 1400) can be used as one factor to optimize headset stability when at rest. FIG. 14A, for example, shows how the center of gravity line 1400 can be at an angle relative to a vertical line 1402, where the vertical line 1402 passes through the centroid of the flat surface of earcup 1404 (e.g., a line normal to the earcup's flat surface). Both the center of gravity line 1400 and the vertical line 1402 pass through the center of the bottom earcup 1404, and when the center of gravity line 1400 is at an angle relative to the vertical line 1402, it indicates instability in the headset when it is at rest. For example, FIG. 14A shows the center of gravity line 1400 tilting away from the vertical line 1402 in the negative X direction (according the coordinate system defined in FIG. 13). As a result, the headset shown in FIG. 14A, would be more likely to tip over in the negative X direction than in the positive X direction.

To optimize stability with regard to the center of gravity of the headset shown in FIG. 14A, the center of gravity line 1400 should be coincident with the vertical line 1402, as shown in FIG. 14B. But if the headset is simply manipulated so that the two lines are coincident, then the earcup 1404 can tilt off the flat surface as shown by the dotted line indicating the flat surface of the earcup 1404. To address this issue, the earcup 1404 can be coupled with the headband such that the vertical line 1402 and the center of gravity line 1400 are coincident and so that both lines are normal to the flat surface of the earcup 1404 as shown in FIG. 14C. In some embodiments, the earcup can be formed into a slightly different configuration (e.g., with additional material amounting to a wedge shape that would fit into the embodiment in FIG. 14B) to eliminate the angled gap between the earcup's flat surface and the resting surface. There are many ways to achieve the same outcome of bringing the center of gravity line into coincidence with the vertical line.

Although ideally the center of gravity line is coincident with the vertical line, it is contemplated that an angle between the center of gravity line and the vertical line can be at an angle of 0°-2.5°, 2.5°-5°, 5°-7.5°, 7.5°-10°, 10°-12.5°, and 12.5°-15°. And although embodiments shown in this application depict headsets with earcups that rest over a user's ears, on-ear earcups can also be implemented without departing from the inventive subject matter.

Thus, specific wireless charging headset systems have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A free-standing wireless charging headset, comprising:
a headband;
a fork body coupled with the headband by a holding mechanism;
an earcup coupled with the fork body and comprising an outer surface and wireless charging coils positioned behind the outer surface, thereby enabling the wireless charging headset to wirelessly charge when resting on the outer surface of the earcup;
wherein the holding mechanism comprises a shaft to couple the headband with the fork body, at least one ball bearing mechanism comprising a spring-loaded ball bearing, and at least one complementary indentation to receive the spring-loaded ball bearing;
wherein the holding mechanism is configured to releasably hold the headband in alignment with the fork body, thereby preventing the wireless charging headset from falling when resting on the outer surface of the earcup; and
wherein the shaft facilitates rotation of the headband relative to the fork body about a single axis of rotation.

2. The headset of claim 1, wherein the outer surface comprises at least one of a rubber and a plastic.

3. The headset of claim 1, wherein the at least one ball bearing mechanism is coupled with the fork body and wherein the headband comprises the at least one complementary indentation.

4. The headset of claim 1, wherein the at least one ball bearing mechanism is coupled with the headband and wherein the fork body comprises the at least one complementary indentation.

5. The headset of claim 1, wherein the wireless charging coils are sized and dimensioned to achieve maximum resonance with a complementary charging coil at a power transmission frequency between 87 kHz and 205 kHz.

6. The headset of claim 1, further comprising:
a second fork body coupled with the headband by a second holding mechanism;
a second earcup coupled with the second fork body and comprising a second outer surface and second wireless charging coils positioned behind the second outer surface so that the wireless charging headset can wirelessly charge when resting on the second outer surface of the second earcup;
the second holding mechanism comprising a second shaft to couple the headband with the second fork body, at least a second ball bearing mechanism comprising a second spring-loaded ball bearing, and at least a second complementary indentation to receive the second spring-loaded ball bearing; and
the second holding mechanism configured to releasably hold the headband in alignment with the second fork body to prevent the wireless charging headset from falling over when resting on the second outer surface of the second earcup;
wherein the second shaft facilitates rotation of the headband relative to the second fork body about a second single axis of rotation.

7. A free-standing headset, comprising:
a headband;
a fork body coupled with the headband by a holding mechanism;
an earcup coupled with the fork body and comprising a flat outer surface;
the holding mechanism comprising a shaft to couple the headband with the fork body, at least one ball bearing mechanism comprising a spring-loaded ball bearing, and at least one complementary indentation to receive the spring-loaded ball bearing;
the holding mechanism configured to releasably hold the headband in alignment with the fork body to prevent the free-standing headset from falling over when resting on the outer surface of the earcup; and
wherein the shaft facilitates rotation of the headband relative to the fork body about a single axis of rotation.

8. The headset of claim 7, wherein the outer surface comprises at least one of a rubber and a plastic.

9. The headset of claim 7, wherein the at least one ball bearing mechanism is coupled with the fork body and wherein the headband comprises the at least one complementary indentation.

10. The headset of claim 7, wherein the at least one ball bearing mechanism is coupled with the headband and wherein the fork body comprises the at least one complementary indentation.

11. The headset of claim 7, wherein the at least one ball bearing mechanism is offset from the shaft.

* * * * *